United States Patent [19]
Theirl et al.

[11] Patent Number: 5,746,408
[45] Date of Patent: May 5, 1998

[54] HINGED, ADJUSTABLE MOUNTING MECHANISM FOR AN OPTICAL FILTER SCREEN

[75] Inventors: Scott G. Theirl, Stillwater; Gerald E. Drake, Oakdale, both of Minn.

[73] Assignee: Minnesota Mining and Manufacturing Company, St. Paul, Minn.

[21] Appl. No.: 596,483

[22] Filed: Feb. 5, 1996

[51] Int. Cl.⁶ .................................................. A47F 1/10
[52] U.S. Cl. ............................ 248/295.11; 248/442.2; 248/918; 359/609
[58] Field of Search ............................ 248/295.11, 918, 248/422.2, 291.1; D14/114; 359/601, 609

[56] References Cited

U.S. PATENT DOCUMENTS

| | | | |
|---|---|---|---|
| 2,039,758 | 5/1936 | Wayne | 248/291.1 X |
| 4,712,870 | 12/1987 | Robinson et al. | 248/918 X |
| 5,227,916 | 7/1993 | Theirl et al. | 359/601 X |
| 5,448,405 | 9/1995 | Clausen et al. | 359/601 |
| 5,459,527 | 10/1995 | Lin | 359/601 X |
| 5,526,180 | 6/1996 | Rausnitz | 359/601 X |

FOREIGN PATENT DOCUMENTS 0 385 037 A2  12/1989  European Pat. Off. .

*Primary Examiner*—Ramon O. Ramirez
*Attorney, Agent, or Firm*—Stephen W. Buckingham

[57] ABSTRACT

An optical filter screen for a visual display monitor includes an optical filter supported by a support frame. A pair of adjustable mounting members support the support frame from a visual display monitor or similar such that the optical filter is positioned adjacent a display area of the display monitor. Each mounting member includes a stem element with a first and second end. A support element is rotatably engaged with the first end of the stem element so that in a first stop position the support element extends outwardly from the stem element to engage a top surface of the visual display unit. The support element folds down into a second storage position in which it lies substantially parallel with the stem element.

26 Claims, 10 Drawing Sheets

HINGED, ADJUSTABLE MOUNTING MECHANISM FOR AN OPTICAL FILTER SCREEN

BACKGROUND OF THE INVENTION

The present invention relates generally to the field of optical filter screens. In particular, the present invention is a hinged, adjustable mounting mechanism for an optical filter screen usable with a visual display monitor.

Typically, translucent, optical filter screens are mounted to visual display monitors (e.g., computer monitors that employ a scanning electron tube display area) in such a manner as to extend over the front of the display area, their purpose being to reduce glare, increase contrast, provide privacy, provide radiation shielding, provide static charge dissipation or a combination of these functions. By reducing the glare from the display area of the display monitor or increasing its contrast, eye fatigue associated with the prolonged use of display monitors is greatly reduced.

Optical filter screens having adjustable mounting mechanisms for securing the screens to visual display monitors are generally known. Such a filter screen is known from U.S. Pat. No. 5,227,916.

Another filter screen and mounting mechanism is available from the Polaroid Corporation, Norwood, Mass., USA and is shown in prior art FIGS. 1 through 3. As seen in FIG. 1, the prior art filter screen 10 includes a frame 12 defined by a top member 14, side members 16, and a bottom member 18. Supported within the frame is a filter 20. A mounting mechanism 22 supports the filter screen 10 from a top surface 24 of a visual display monitor, such as a computer monitor 26, such that the filter 20 is positioned in front of a display area of the monitor 26.

The mounting mechanism 22 includes left and right top mounts 28, each having a vertical section 29 and a horizontal section 30. A small plate 31 is secured to the horizontal section 30 by interference fit. The bottom surface 33 of the small plate 31 is adhesively secured to the top surface 24 of the monitor 26. A hook and loop attachment device (not shown) is provided on the bottom member 18, one portion of which is adhesively joined to the monitor 26. The hook and loop device stabilizes the frame 12 in front of the display area of the monitor 26. The small plate 31, the loop and hook device, and the horizontal section 30 allow the top mount 28, and thereby the filter screen 10, to be attached to the monitor 26. The horizontal sections 30 must be removed from the small plates 31 and the loop and hook device has to be separated if the filter screen 10 is to be removed as best shown in FIG. 3.

The vertical section 29 of the top mount 28 is adapted to be received in a hole 34 in the top member 14 of the frame 12. The vertical section 29 is releasably held in the frame 12 by means of a toggle clamp 36. The horizontal section 30 may be rotated about the axis through the vertical section 29 or moved further out or in to the frame 12 when toggle clamp 36 is released. The height of the filter 10 depends on the length of the vertical section 29 above the toggle clamp 36. As the vertical section 29 is infinitely adjustable in the hole 34, differences of exposed lengths of the left and right vertical sections can occur despite careful placing which may result in a displeasing aesthetic appearance. If the height of the frame 12 must be adjusted after initial placement, it may be necessary to also reposition the hook and loop device. Transfer of the filter screen 10 to another monitor requires separation of the adhesive bonds between the small plates 31 and the top surface 24 as well as removing the hook and loop device. If the filter screen 10 is removed for temporary storage, e.g. when moving offices, it is necessary to store several different loose pieces including adhesive coated parts such as the small plates 31.

The small plates 31 have to be adhesively bonded to the top surface 24 of the monitor 26 in relatively precise positions if the horizontal sections 30 are to be perpendicular to the frame 12 when in use. This is often difficult to do which may result in a displeasing aesthetic appearance.

There is a continuing need for improved optical filter screens with adjustable mounting mechanisms. Specifically, there is a need for an adjustable mounting mechanism having one or more of the following characteristics: ease of installation, can be preassembled, compact packaging and shipping, can be safely stored and transported, may be easily removed from a monitor, is storable after initial use as a single piece without exposed adhesive surfaces, requires little space in the storage condition and is aesthetically pleasing when installed on a monitor.

SUMMARY OF THE INVENTION

The present invention is an optical filter screen for a visual display monitor or similar. The filter screen includes an optical filter supported by a support frame. An adjustable mounting mechanism supports the support frame from the visual display monitor such that the antiglare filter is positioned adjacent a display area of the display monitor. The mounting mechanism includes a slidable engagement mechanism for slidably engaging the first and second side members of the support frame. The mounting mechanism also includes a stem having a first end and an oppositely disposed second end. The mounting mechanism further includes a support element rotatably engaged with the first end of the stem. In a stop position the support element extends outwardly from the first end of the stem to engage the top surface of the monitor. The support element may be folded down so that it lies substantially parallel to the stem.

This optical filter screen with adjustable mounting mechanism and rotatable support element is relatively uncomplicated. The rotatable support element allows the filter screen to be shipped in a slim, flat condition and also allows the filter screen to be removed from the monitor after use and stored in the flat condition as a single piece without risk of breakage of the support element even if loaded from above.

The mounting mechanism may include a stop position maintaining device which maintains the rotatable support element in its stop position. Thus, once the mounting mechanism has been placed on a visual display monitor, the screen may be removed and replaced without the support elements collapsing into their folded position.

The mounting mechanism may include two mounting members, each of which includes a stem. Each mounting member may further include a slidable latching device incorporated in the stem of the optical filter screen for adjusting the height of the antiglare filter with respect to the monitor.

The slidable latching device may include a latch member and a latch operator to move the latch member between a latched state that holds the filter screen in a desired position relative to a display area of a monitor and an unlatched state that allows movement of the filter screen relative to the display area. The filter screen can be smoothly and easily adjusted relative to the display area without using a great deal of force or removing the mounting members from the filter screen. Therefore, this mounting member arrangement allows the filter of the filter screen with mounting mechanism to be easily leveled and properly centered with respect to the display area of the monitor with minimal manual manipulation and allows safe storage and transport.

DETAILED DESCRIPTION OF THE PREFERRED EMBODIMENT

Figure 1A:
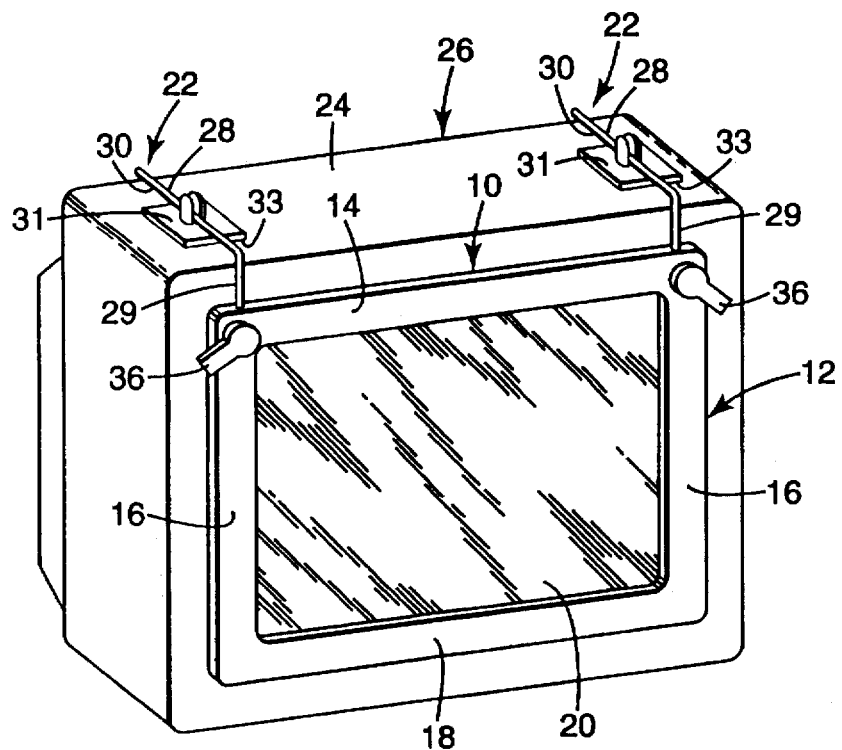
FIGS. 1A and 1B show perspective views of a prior art optical filter screen and mounting mechanism secured to a visual display monitor.
Figure 1B:
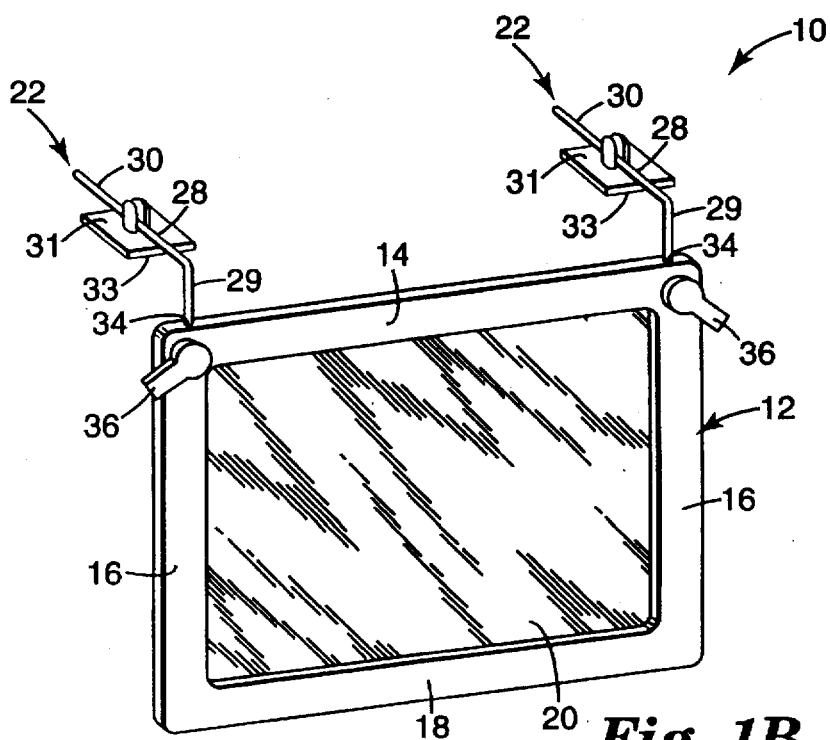
Figure 2A:
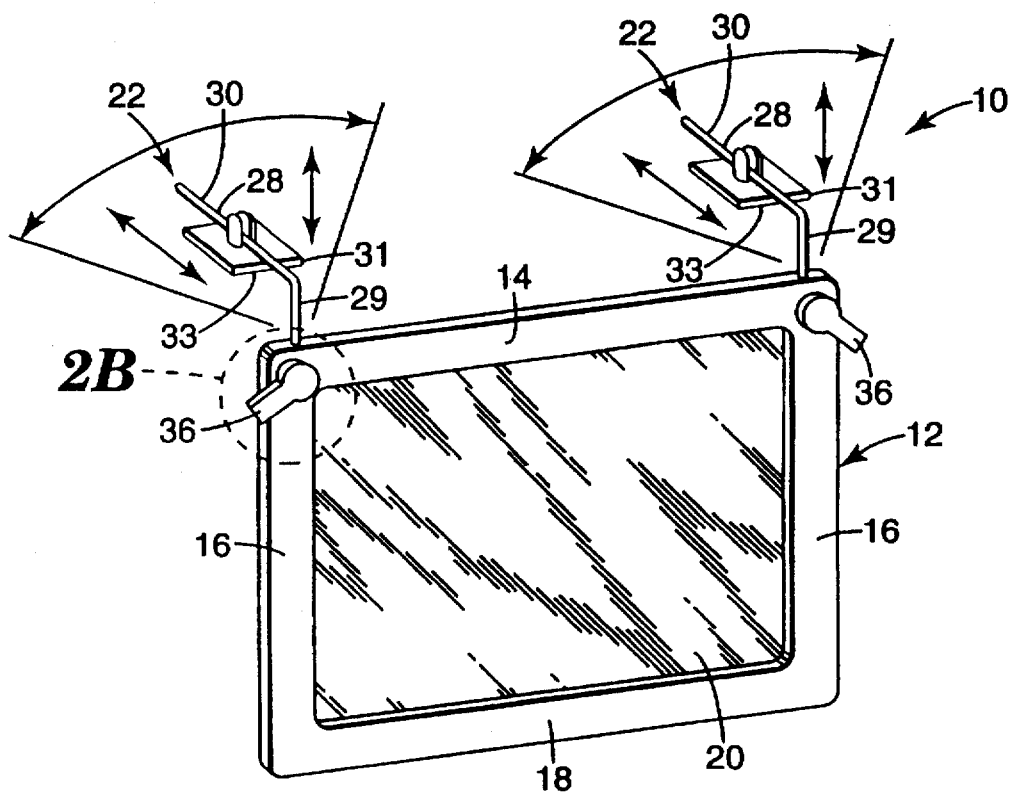
FIGS. 2A and 2B show perspective views of an optical filter screen of the prior art of FIG. 1 showing details of the adjustment of the mounting mechanism.
Figure 2B:
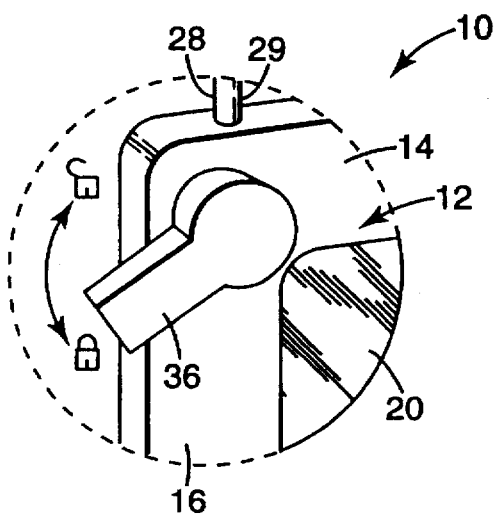
Figure 3:
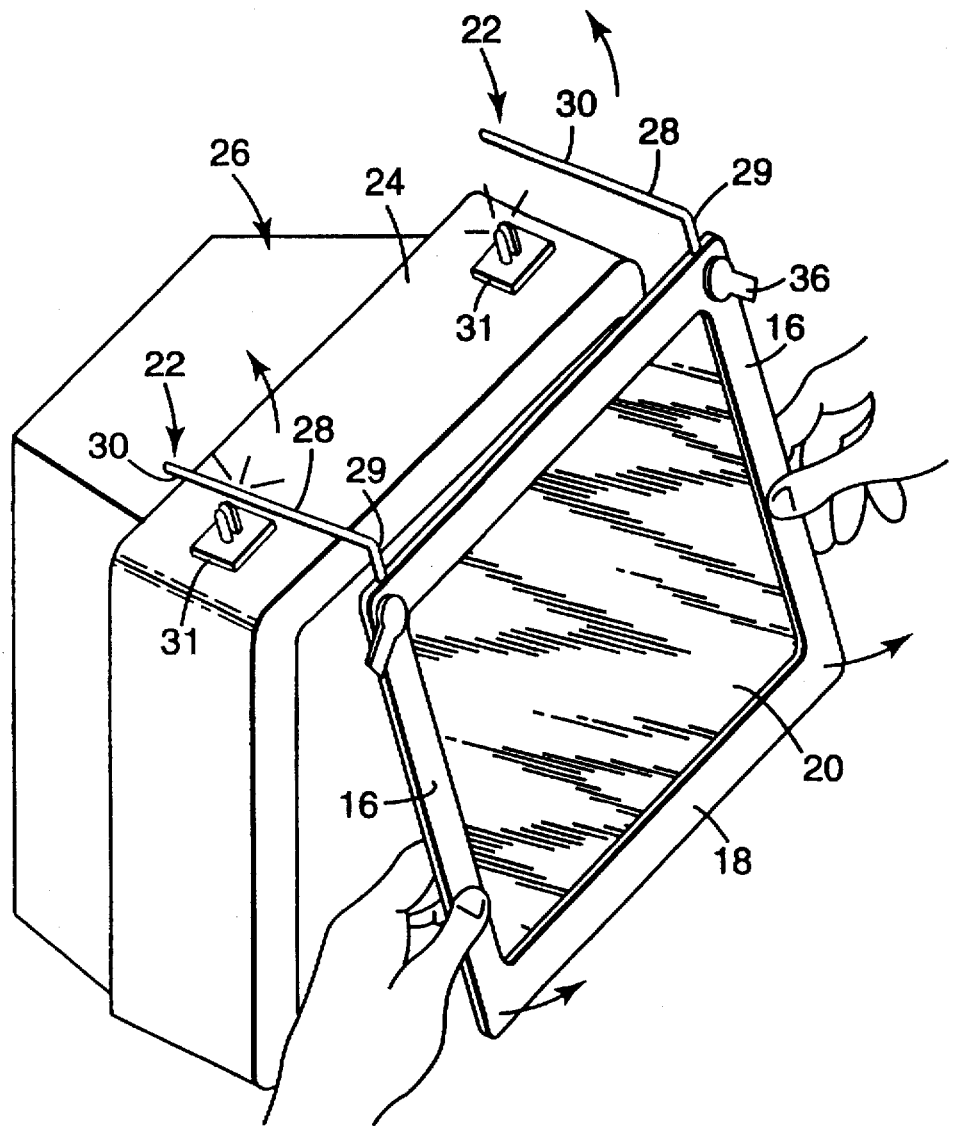
FIG. 3 shows a perspective view of the prior art mounting member secured to the prior art filter screen and detached from the visual display monitor.
Figure 4:
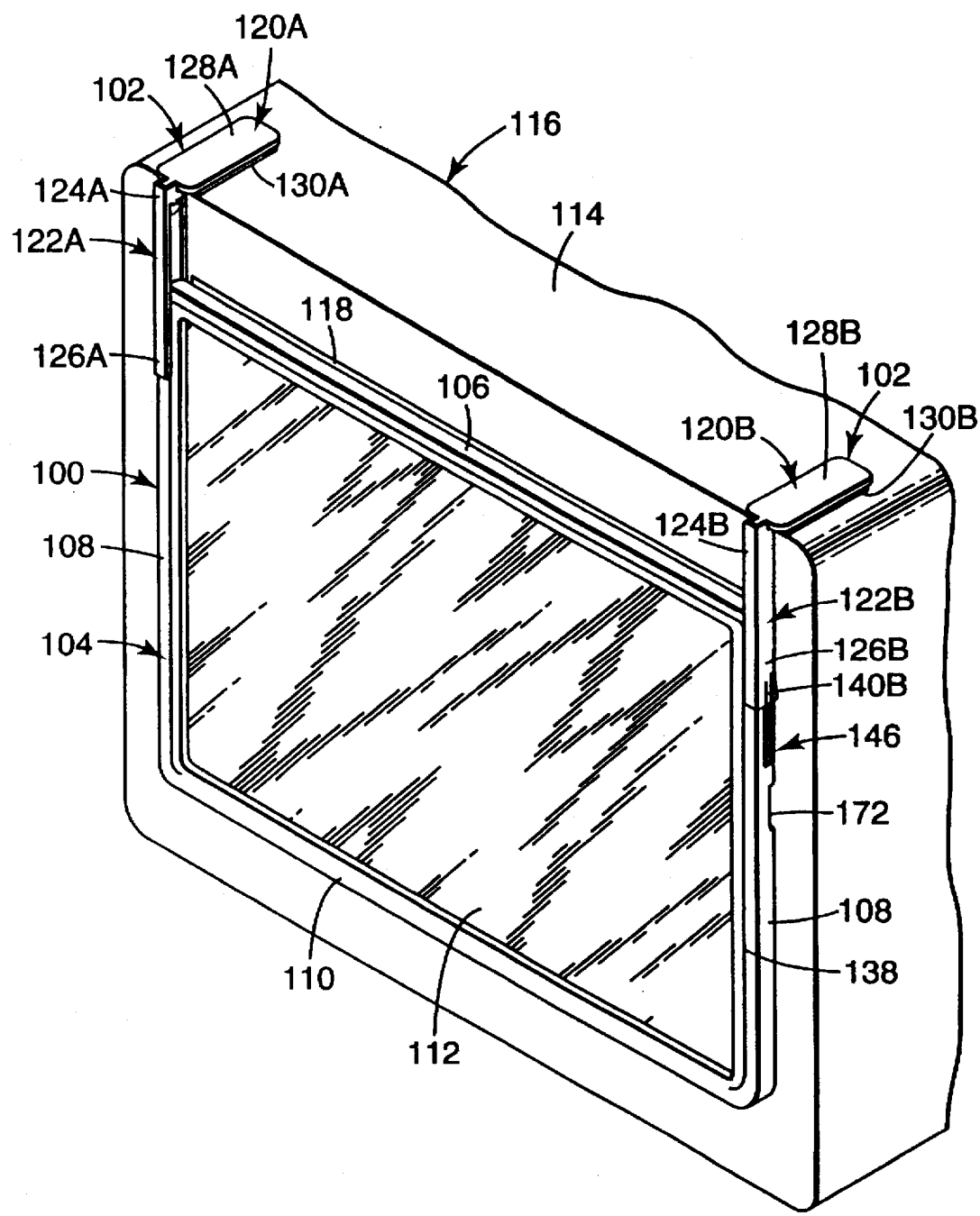
FIG. 4 is a perspective view of an optical filter screen and mounting mechanism in accordance with the present invention.
Figure 5:
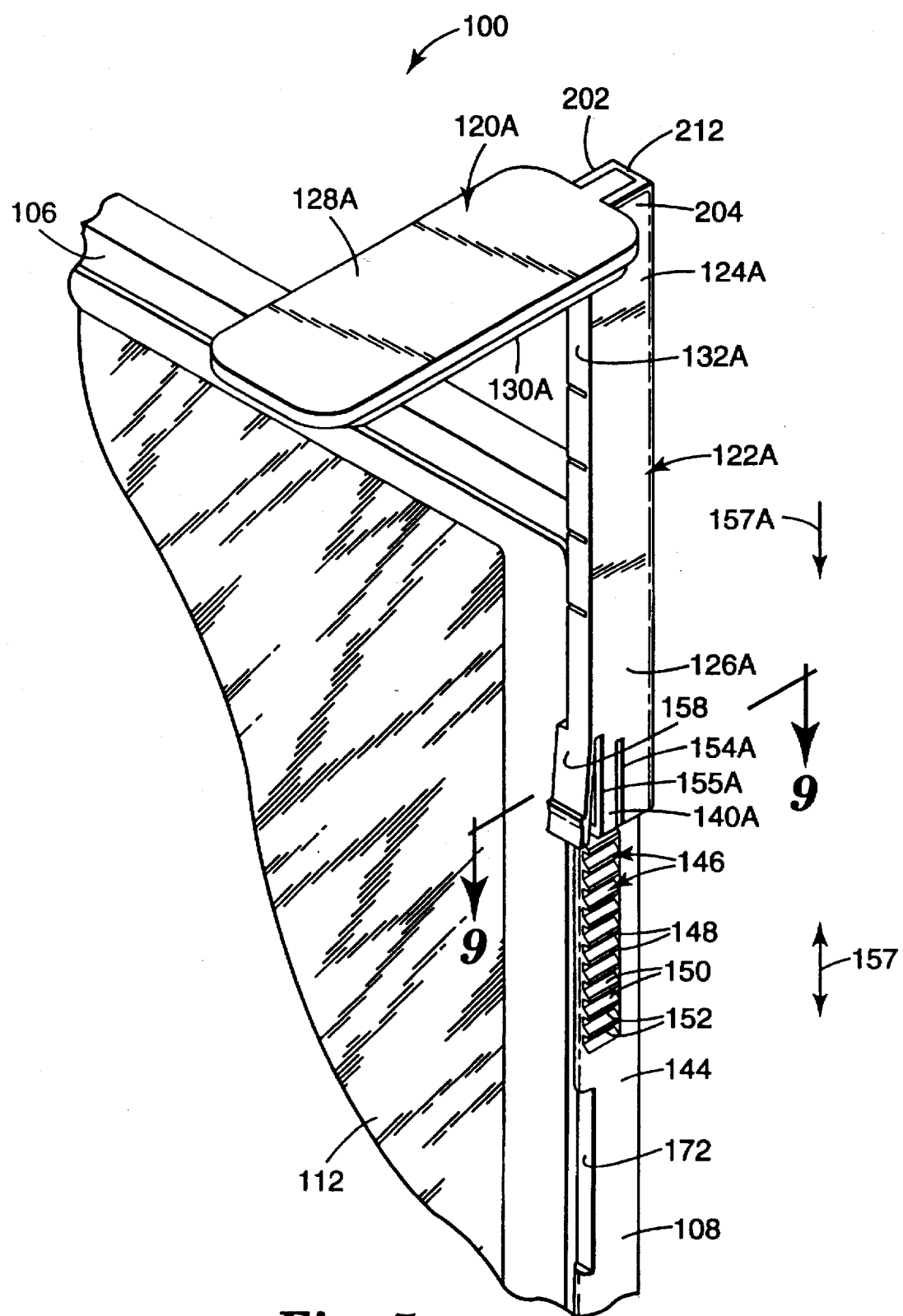
FIG. 5 is an enlarged perspective view showing details of a mounting member of the mounting mechanism and a side member of the filter screen of FIG. 4.

An optical filter screen 100 having a mounting mechanism 102 in accordance with the present invention is illustrated generally in FIGS. 4 and 5. The filter screen 100 includes a frame 104 defined by a top member 106, side members 108 and a bottom member 110. Supported within the frame 104 is an optical filter 112. As seen best in FIG. 4, the mounting mechanism 102 supports the filter screen 100 from a top surface 114 of a visual display monitor, such as a computer monitor 116, so that the optical filter 112 is positioned in front of a display area 118 of the computer monitor 116. The mounting mechanism 102 includes a pair of mounting members 120A and 120B. Only the mounting member 120A will be described with particularity.

As seen best in FIG. 5, the mounting member 120A includes a stem element 122A having a first end 124A and a second end 126A. Rotatably engaged with the first end 124A of the stem element 122A is a support element 128A. In a first position, the support element 128A extends substantially perpendicular to the longitudinal extent of the stem element 122A. As seen best in FIG. 4, the support elements 128A and 128B of the mounting members 120A and 120B, respectively, when in the first position, are adapted to engage the top surface 114 of the computer monitor 116 to support the filter screen 100, such that the filter 112 is positioned in front of the display area 118 of the monitor 116. Bottom surfaces of the support elements 128A and 128B include foam rubber pads 130A and 130B, respectively, which help to prevent movement of the mounting members 120A and 120B and thereby the optical screen 100 relative to the display area 118 of the computer monitor 116. In a second position the support element 128A is folded down towards and substantially parallel to the stem element 122A as best shown in FIG. 8.

Figure 6A:
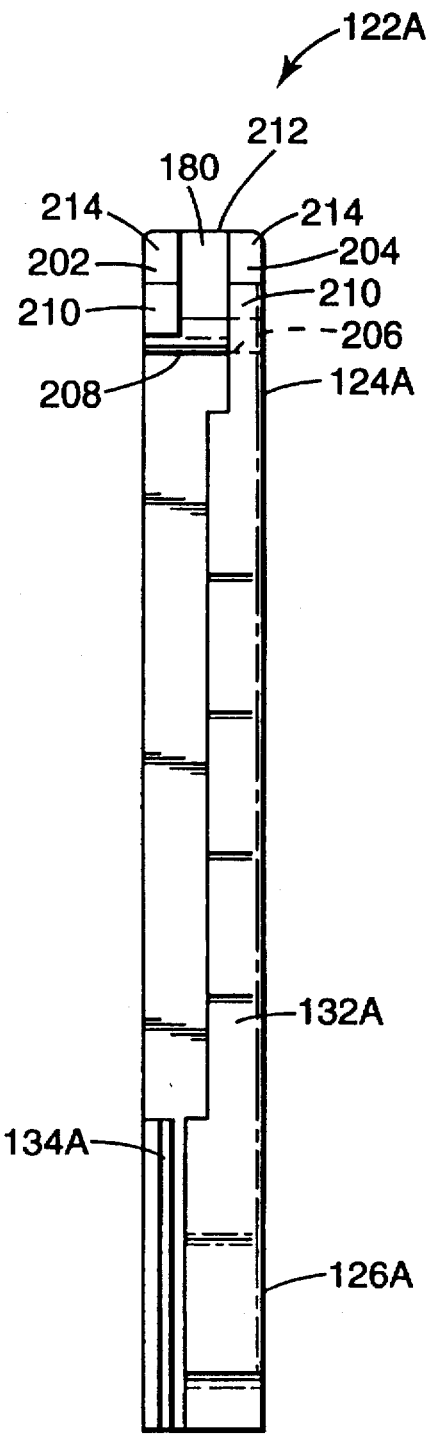
FIGS. 6A and B show views of a stem element in accordance with the present invention.
Figure 6B:
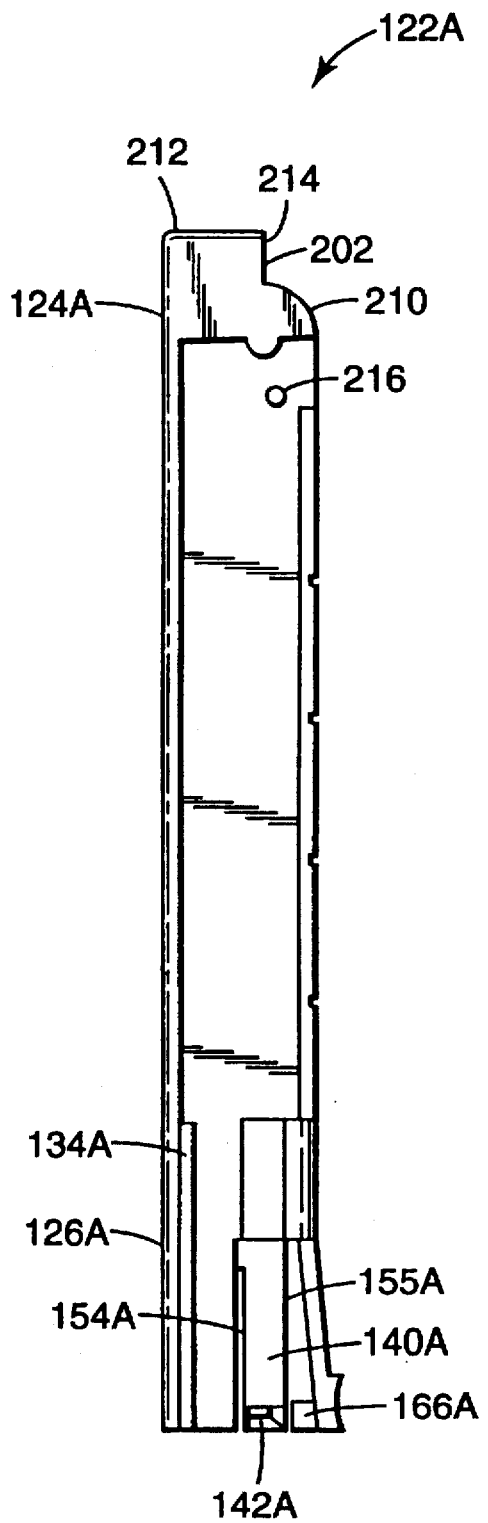

As best seen in FIGS. 6 A, B and 7 A–C, mounting member 120A comprises a stem element 122A which is adapted to receive a support element 128A. Two oppositely opposed trunion elements 202, 204 are integral with and extend substantially perpendicular to a back wall 180 of the stem element 122A. The outer surfaces of the trunion elements 202, 204 are substantially flush with the outer edges of the stem element 122A. The trunion elements 202, 204 are provided with a fixed rod 208, or axle or holes 206 which support a rod or axle 208 in a fixed position. The axis of the rod or axle 208 lies substantially perpendicular to the longitudinal axis of the stem element 122A and is spaced from the back wall 180 of the stem element 122A. The outer trunion element 204 may be formed integrally with a first leg 132A that is integral with and extends substantially perpendicular to the back wall 180 of the stem element 122A. Each trunion element 202, 204 has an arcuate section 210 which extends over an arc of approximately 90° from a position lying on a horizontal line through the center of the hole or fixed rod 206 or 208 upwards towards the end face of the first end 124A of the stem element 122A. The end surfaces 212 of the trunion elements 202, 204 are flush with the end surface of the first end 124A and extend perpendicular to the stem element 122A. A vertical face 214 of the trunion 202 or 204 runs from the upper end of the arcuate section 210 to the end surface 212 of the trunion element 202 or 204.

The support elements 128A and 128B may be identical. The symmetrical form allows a single design of product to be used. The invention is not limited thereto. As best shown in FIGS. 7A–C the support element 128A includes a flat support section 302 whose underside is provided for receiving a foam rubber high friction pad 130A. Integral with one end 304 of the flat support section 302 is a nose portion 306 which is located in a central portion of the end 304. The nose portion 306 extends perpendicularly to the plane of the flat support section 302. On either side of the nose portion 306 are shoulder portions 308 of the end 304. On the inner part of the nose portion 306, an opening 310 is provided. The opening 310 may be provided with a tapered entry portion 312 leading to a semi-circular opening 314 whose diameter is arranged to form a close sliding fit with the rod or axle 208 of the stem element 122A. A region (not shown) of the inner end of the tapered section 312 may be dimensioned slightly smaller than the diameter of the rod or axle 208 so that the rod or axle 208 must be forced lightly past this restriction before the rod or axle 208 reaches a stress-free position in the opening 314. The outer edge of the nose portion 306 is preferably arcuate as best shown in FIG. 7A so that when rod or axle 208 is located in opening 314 the support element 128A may rotate about the axle or rod 208 while maintaining a predetermined distance between the arcuate surface and the back wall 180 of the stem element 122A.

Figure 8:
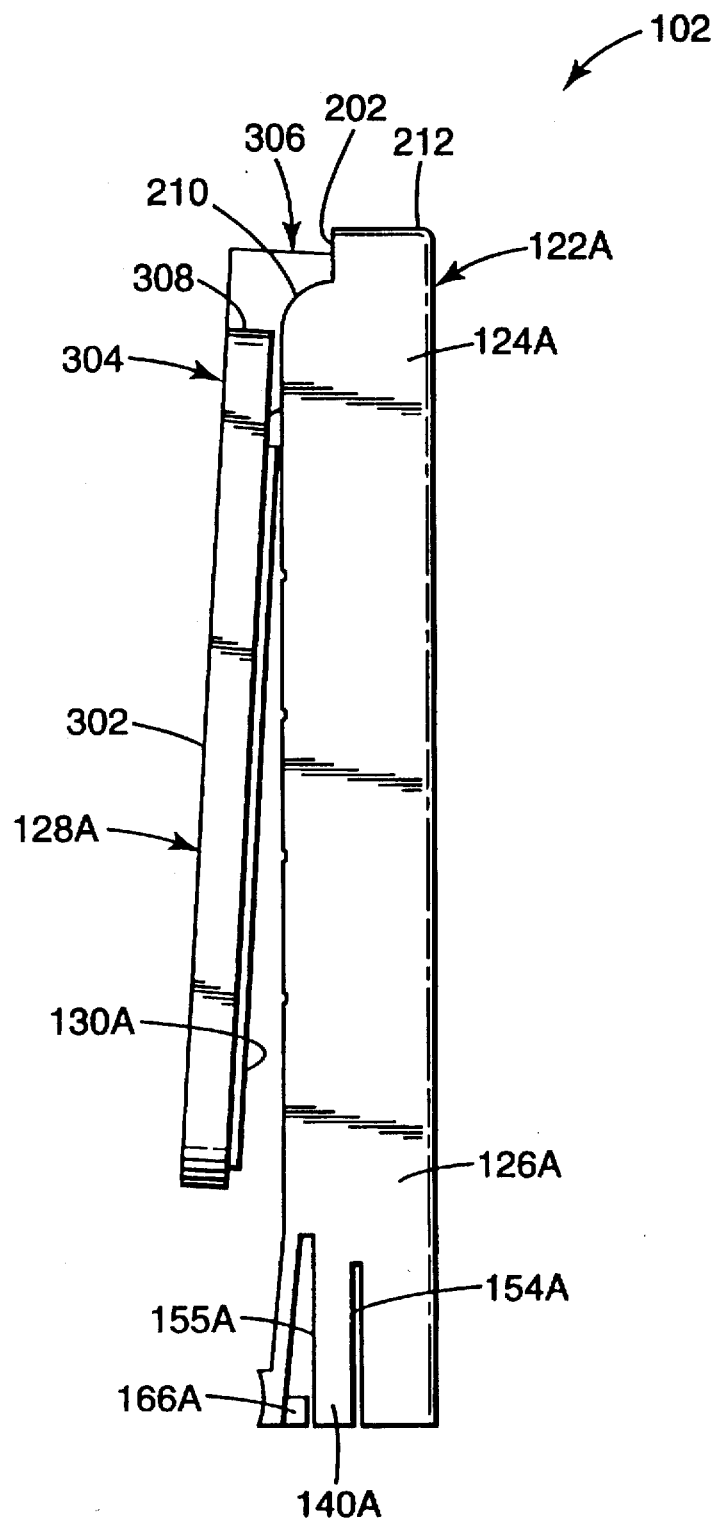
FIG. 8 shows a support element engaged with a stem element in accordance with the present invention in the storage position.

The support element 128A and the stem element 122A are assembled together by sliding the tapered section 312 of support element 128A over the rod or axle 208 of the stem element 122A until the rod or axle 208 reaches its end position in the opening 314 as best shown in FIG. 8. The support element 128A and the stem element 122A are dimensioned so that in the first position the stem element 128A extends substantially perpendicular to the stem element 122A in a stopped position. The shoulder portions 308 of the end 304 of the support element 128A and/or the outer end surface 318 of the nose portion 306 abut the vertical faces 214 of the trunion elements 202, 204 or the back wall 180 of the stem element 122A, respectively. It is preferred if no details of the hinge mechanism can be seen when the filter screen 110 is mounted on the monitor 116 and the construction is viewed from the front.

The mounting members 120A and 120B may include stop position maintaining devices which maintain the support elements 128A and 128B in theresprespective stop positions. For example, a small protrusion 216 (best shown in FIG. 6B) may be provided on an inner side surface of trunion element 202 or 204 which cooperates with a passing recess 316 (best shown in FIG. 7A) in the support element 128A to hold the support element 128A, 128B against its own weight when the support element 128A, 128B is in the first position.

Figure 7D:
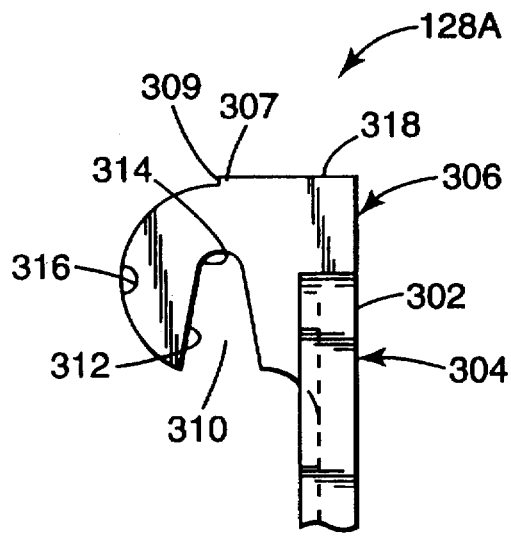
FIGS. 7D and E show views of stop position maintaining devices in accordance with the present invention.
Figure 7B:
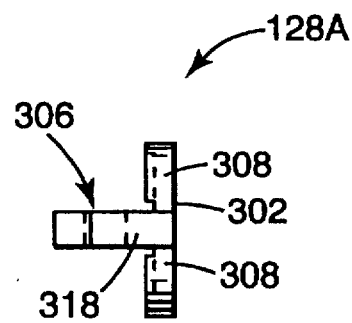
FIGS. 7A to C show views of a support element in accordance with the present invention.
Figure 7C:
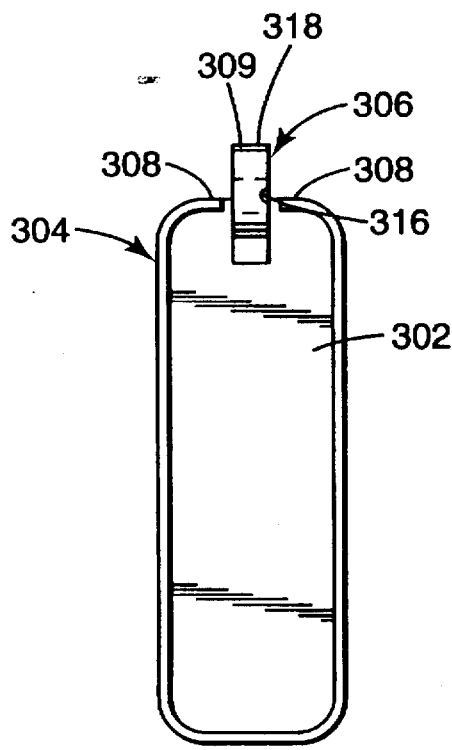
Figure 7A:
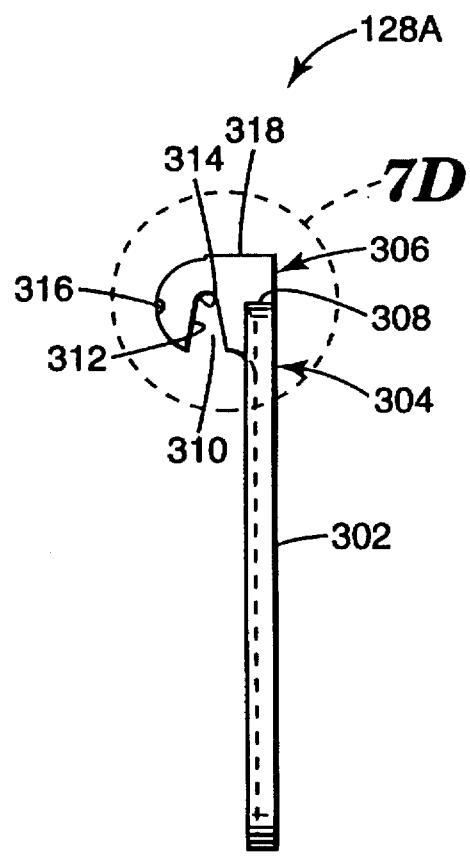

Alternatively the outer end surface 318 of the nose portion 306 may be extended by a small amount in the direction away from the center of the opening 314 and longitudinally with respect to the support element 128A to form a step 307 as best shown in the detailed drawing FIG. 7D. The step 307 may be of the order of 0.05 inch.

The distance between the center of the opening 314 and the outer end surface 318 along a perpendicular to the latter may be chosen so that the end 309 of the step 307 remote from the flat support section 302 is a slight interference fit with the back wall 180 of the stem element 122A when the support element 128A is rotated about the rod or axle 208 towards its working position. By exerting more turning moment on the support element 128A the end 309 can be moved past its interference fit position so that the flat end surface 318 abuts the back face 180 of the stem element 122A. It is preferable if there is no interference between the flat end surface 318 and the back face 180 in this position so that the arrangement is stress-free. The interference between the end 309 of the step 307 and the back face 180 is sufficient to maintain the support element 128A in this position against its own weight.

Figure 7E:
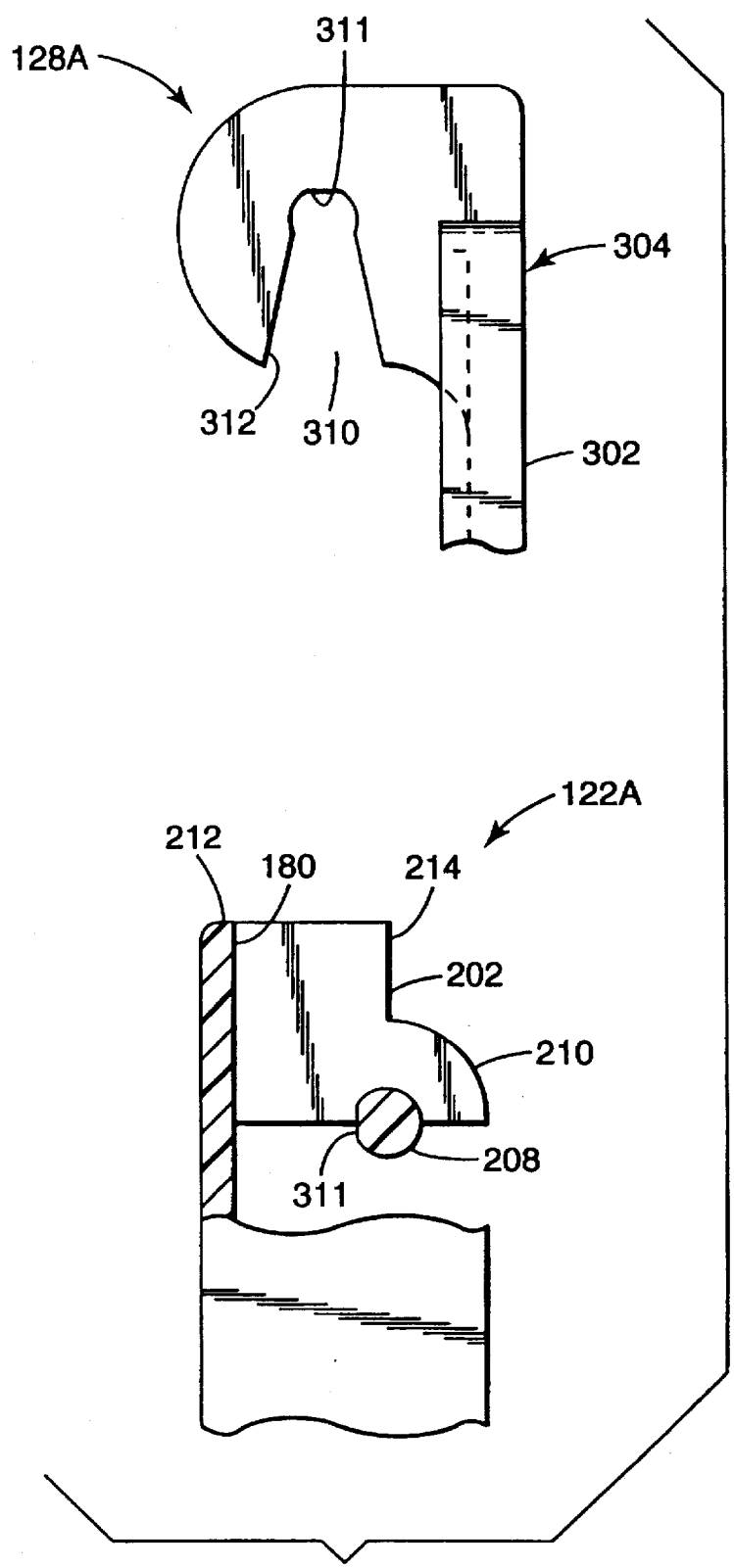

The stop position maintaining device may also include providing the rod or axle 208 and the opening 314 with one or more corresponding flats 311 as best shown in FIG. 7E or by making the rod or axle 208 and the opening 314 somewhat rectangular or quadratic (not shown). By locating the flats 311 in appropriate positions on the rod or axle 208 and the hole 314, the support element 128A may be maintained in the stop position against its own weight.

As shown best in FIG. 8, the support element 128A lies substantially parallel to the stem element 122A in the second or storage position. The support element 122A can be moved (rotated) into the storage position independent of whether the mounting mechanism 102 is mounted to the frame 104.

As described above an embodiment of the invention includes trunion elements 202, 204 on the stem element 122A and a nose portion 306 on the support element 128A. Included within the scope of the present invention is an arrangement in which the trunion elements 202, 204 are provided on the support element 128A and the stem element 122A includes the nose portion 306 (not shown). Further, the opening 310 may be provided in each trunion element 202, 204 and the rod or axle 208 may be provided on the nose portion 306 (not shown).

Figure 9:
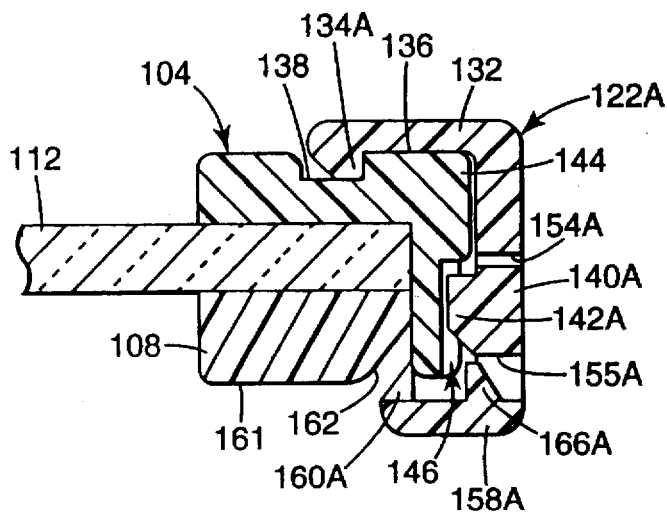
FIG. 9 is a sectional view taken along line 9—9 in FIG. 5 showing a latched state of a latch-member of the mounting member shown in FIG. 5.
Figure 10:
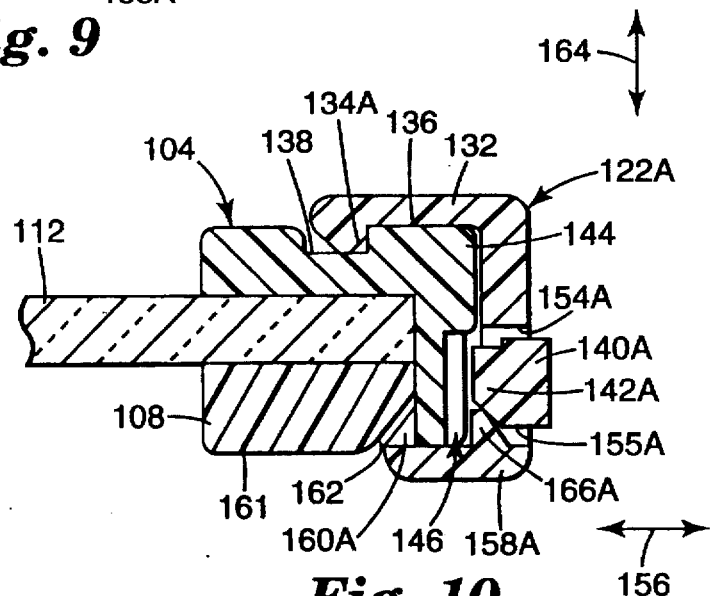
FIG. 10 is a sectional view, similar to FIG. 9, showing an unlatched state of the latch member of the mounting member.
Figure 11:
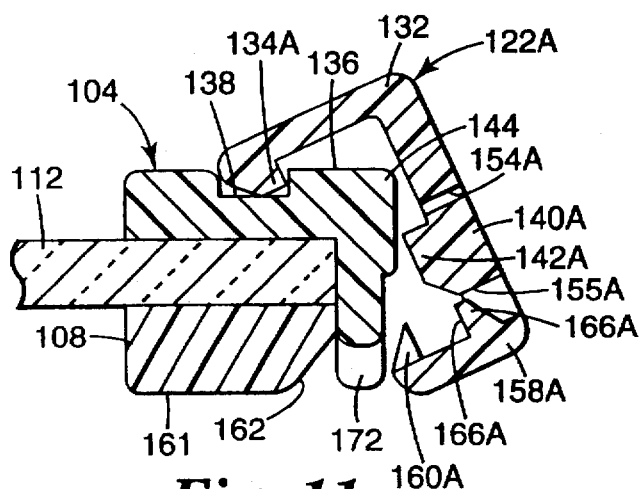
FIG. 11 is a sectional view, similar to FIG. 9, with the mounting member being removed from the side member of the antiglare screen in accordance with the present invention.

As seen best in FIGS. 9-11, the second end 126A of the stem element 122A includes a first leg 132A that is integral with and extends substantially perpendicular to the stem element 122A. A free end of the first leg 132A includes an outwardly extending ledge portion 134A. When the mounting member 120A is secured to the side member 108 of the frame 104, the first leg 132A abuts a front surface 136 of the side member 108 and the ledge portion 134A engages a longitudinal channel 138 that extends along the length of the side member 108. The longitudinal channel 138 allows the mounting member 120A to be the moved along the length of the side member 108.

The second end 126A of the stem element 122A further includes a movable latch member 140A that is integral with the stem element 122A. A free end of the latch member 140A includes an outwardly extending latch ledge 142A. As seen best in FIG. 5, an outer surface 144 of the side member 108 includes a plurality of linearly arranged latch recesses 146. The latch recesses are separated by latch ridges 148, with each latch ridge 148 having an angled top surface 150 and a substantially perpendicular bottom surface 152.

As seen in FIG. 5, the stem element 122A includes cutouts 154A and 155A to either side of the latch member 140A. The cutouts 154A and 155A allow the latch member 140A to flex (i.e. move) relative to the side member 108 of the frame 104 in a direction substantially parallel to the display filter 112 as presented by the double headed directional arrow 156 in FIG. 10. The latch member 140A is movable (i.e., can be flexed) between an unlatched state wherein the filter screen 100 can be vertically moved (as presented by the double headed directional arrow 157 in FIG. 5) relative to the mounting members 120A and 120B and the display area 128 of the display monitor 126, and a latched state wherein the filter screen 100 is held in a desired position relative to the display area 118. The latch ledge 142A is engageable with any one of the plurality of latch recesses 146 to define the desired position of the antiglare screen 100.

The mounting member 120A further includes a second leg, or latch operator 158A which is integral with and extends substantially perpendicular to the longitudinal extent of the stem element 122A. A free end of the latch operator 158A includes an outwardly extending ledge element 160A. As seen in FIGS. 9-11, when the mounting member 120A is secured to the side member 108 of the frame 104, the latch operator 156A is adjacent a rear surface 161 of the side member 108 and the ledge element 160A engages a longitudinal slot 162 that extends along the length of the side member 108. The longitudinal slot 162 allows the mounting member 120A to be moved along the length of the side member 108.

As seen best in FIG. 10, the cutout 155A, allows the latch member 158A to flex (i.e., move) in a direction (as represented by double headed directional arrow 164 in FIG. 10) perpendicular to the stem element 122A. The latch operator 158A is manually movable (i.e., by finger pressure) between a disengaged state, wherein a cam member 166A of the latch operator 158A is spaced from a beveled surface of the latch member 140A (see FIG. 9), and an engaged state, wherein the cam member 166A is engaged with the beveled surface of the latch member 140A and thereby moves the latch member 140A out of engagement with a recess 146 and thereby permits the mounting member 120A to be moved relative to the filter screen 100. Movement of the filter screen 100 relative to the mounting members 120A and 120B allows the filter 112 to be easily leveled and properly centered with respect to the display area 118 of the monitor 116.

In addition, the mounting member 120A can be moved in one direction (as represented by the directional arrow 157) relative to the filter screen 100 and without actuation of the latch operator 158A, due to the angled top surfaces 150 of the ridges 148. The angled top surfaces 150, upon the application of sufficient force to the mounting member allows the latch member 140A to simply ride over the ridges 148. The perpendicular bottom surfaces 152 of the ridges 148 would prevent such ease of movement in the opposite direction to that indicated by arrow 157A.

As seen in FIG. 5, the outer surface 144 of the side member 108 further includes a cutout 172 located below (as shown) or above (not shown) the recesses 146. As seen in FIG. 11, when the mounting member 120A is positioned such that the ledge element 160A is centered within the cutout 172, the mounting member 120A can be removed from the side member 108 of the frame 104 for the purpose of cleaning or to replace a damaged mounting member.

The optical filter screen 100 with the hinged mounting mechanism 102 is relatively uncomplicated. Further, by providing the filter screen 100 with a pair of mounting members 120A and 120B, with each mounting member 120A and 120B having a latch member 140A and 140B and a latch operator 158A and 158B to move the latch member 140A and 140B between a latched state that holds the filter sin a desiring a desired position relative to the display area 118 of the monitor 116 and an unlatched state that allows movement of the filter screen 100 relative to the display area 118, the filter screen 100 can be smoothly and easily adjusted relative to the display area 118 without using a great deal of force or removing the mounting members 120A and 120B from the filter screen 100.

This mounting member arrangement allows the filter screen 100 to be packaged in a small space for transport and to be installed easily onto a video unit. The hinged design of the mounting members 120A and B allows the filter to be removed and stored in the collapsed position in one piece and without the exposure of adhesive surfaces. Further, this mounting member arrangement allows the filter 112 of the filter screen 100 to be easily leveled and properly centered with respect to the display area 118 of the monitor 116 with minimal manual manipulation.

Although the present invention has been described with reference to preferred embodiments, workers skilled in the art will recognize that changes may be made in form and detail without departing from the spirit and scope of the invention.

What is claimed is:

1. An optical filter screen for a visual display monitor, comprising:
    a support frame including first and second side members;
    an optical filter supported by the support frame; and
    a mounting means for supporting the support frame from a visual display monitor such that the filter is positioned adjacent a display area of the display monitor, the mounting means including:
        sliding engagement means for slidably engaging the first and second side members of the support frame;
        a stem element having a first end and an opposite second end, and
        a support element rotatably engaged with the first end of the stem element; said support element having a stop position in which it extends outwardly from the first end of the stem element to engage a top surface of the visual display monitor for supporting the support frame of the filter screen and having a storage position in which it is folded down towards and substantially parallel with said stem element wherein one of the support element and the stem element includes two trunion elements with a support rod fixed therebetween and the other of the stem element and support element includes a nose portion with an opening for sliding receipt of said support rod.

2. The filter screen of claim 1 wherein the support element forms a hinge with the stem element.

3. The filter screen according to claim 1 wherein said support element includes a flat support portion and said nose portion is integral with the flat support portion and extends perpendicularly to the plane of the flat support portion, said nose portion being located centrally on one end of said flat support portion.

4. The filter screen of claim 3 wherein said flat support portion further includes shoulder portions adjacent the centrally placed nose portion and said shoulder portions abut said trunion elements when the support element is in the first stopped position.

5. The filter screen according to claim 1 wherein said opening includes an open tapered section and a part-circular section adjacent thereto for receipt of said support rod.

6. The filter screen according to claim 1 further comprising a stop position maintaining device.

7. The optical filter screen of claim 6 wherein the first and second side members of the support frame each include front, back and side outer surfaces, and wherein at least one of the outer surfaces of at least one of the side members carries a plurality of latch recesses, and wherein the mounting means includes at least one movable latch member having a portion thereof releasably engageable with the latch recesses.

8. The optical filter screen of claim 7 wherein the releasably engageable portion of the latch member may be flexed between an unlatched state, wherein the releasably engageable portion is disengaged from the latch recesses and the optical filter may be vertically positioned relative to the display area of the display monitor, and the latched state, wherein the releasably engageable portion is engaged to the latch recesses and the optical filter is held in the desired vertical position.

9. The optical filter screen of claim 8 wherein the mounting means further comprises latch operator means for disengaging the latch member from the latch recesses in the flexed unlatched state of the latch members.

10. The optical filter screen of claim 7 wherein said sliding engagement means comprises:
    longitudinal channels on the front and back surfaces of each of the first and second side members; and
    leg members extending outwardly from the second end of the stem element, each leg member having a mating member that is adapted to engage the longitudinal channel of the respective side member of the support frame, the longitudinal channels allowing longitudinal movement of the mounting member relative to the side member of the support frame.

11. The optical filter screen of claim 10, wherein the leg members are flexibly attached to the stem element for facilitating engagement to the support frame.

12. The optical filter screen of claim 7, wherein the latch recesses are separated by latch ridges, the latch ridges having angled top surfaces and perpendicular bottom surfaces.

13. The filter screen of claim 1 wherein said mounting means is adjustable and further comprises:
    a latch means movable between an unlatched state wherein the filter can be moved relative to the display area of the display monitor and a latched state wherein the display filter is held in a desired position relative to the display area of the display monitor.

14. The filter screen of claim 13 wherein said adjustable mounting means further comprises:
   a movable latch operating means for moving the latch means between the unlatched state and the latched state.

15. The filter screen of claim 14 wherein the latch means is movable in a first direction between the latched state and the unlatched state, and the latch operating means is movable in a second direction substantially perpendicular to the first direction to actuate the latch means between the latched and unlatched states.

16. The filter screen of claim 1 wherein the mounting means is adjustable and includes:
   first and second mounting members engageable with the first and second side members, respectively of the support frame, each mounting member including a latch means defined by a movable latch member and a latch operating means defined by a movable latch operator.

17. The filter screen of claim 16 wherein each of the first and second side members includes a longitudinal channel, and wherein each mounting member further includes:
   a leg member extending outwardly from the second end of the stem element, the leg member having a ledge portion that is adapted to engage the longitudinal channel of the respective side member of the support frame, the longitudinal channel allowing longitudinal movement of the mounting member relative to the side member of the support frame.

18. The filter screen of claim 17 wherein each of the first and second side members of the support frame includes a plurality of linearly aligned latch recesses, and wherein the latch member of the respective mounting member is selectively engageable with a desired latch recess, in the latched state of the latch member, to define the desired position of the antiglare filter relative to the display area of the display monitor.

19. The filter screen of claim 16 wherein each of the first and second side members includes a longitudinal slot, and wherein the latch operator of each mounting member includes:
   a ledge element that is adapted to engage the longitudinal slot of the respective side member of the support frame, the longitudinal channel allowing longitudinal movement of the mounting member relative to the side member of the support frame.

20. The filter screen of claim 19 wherein each of the first and second side members of the support frame further includes a cutout section along the longitudinal slot, that permits the ledge element of the respective mounting member to be disengaged from the slot to allow the mounting member to be removed from the support frame of the filter screen.

21. The filter screen of claim 16 wherein the latch operator of each mounting member includes a cam member and wherein the latch member is movable between a disengaged state, wherein a cam member is spaced from the latch member, and an engaged state, wherein the cam member is engaged with the latch member so as to move the latch member from the latched state to the unlatched state and thereby permit the respective mounting member to be moved relative to the support frame.

22. The filter screen of claim 21 wherein the latch member is movable in a first direction between the latched state and the unlatched state, and the latch operator is movable in a second direction, substantially perpendicular to the first direction, between the engaged state and the disengaged state.

23. An optical filter screen for a visual display monitor, comprising:
   a support frame including first and second side members;
   an optical filter supported by the support frame; and
   a mounting means for supporting the support frame from a visual display monitor such that the filter is positioned adjacent a display area of the display monitor, the mounting means including:
      sliding engagement means for slidably engaging the first and second side members of the support frame;
      a stem element having a first end and an opposite second end, and
      a support element rotatably engaged with the first end of the stem element; said support element having a stop position in which it extends outwardly from the first end of the stem element to engage a top surface of the visual display monitor for supporting the support frame of the filter screen and having a storage position in which it is folded down towards and substantially parallel with said stem element wherein stop position maintaining device comprising said support element including a flat outer end surface having a stepped end, said stepped end of said flat outer end surface being an interference fit with said stem element when said support element rotatably engages said stem element.

24. An optical filter screen for a visual display monitor, comprising:
   a support frame including first and second side members;
   an optical filter supported by the support frame; and
   a mounting means for supporting the support frame from a visual display monitor such that the filter is positioned adjacent a display area of the display monitor, the mounting means including:
      sliding engagement means for slidably engaging the first and second side members of the support frame;
      a stem element having a first end and an opposite second end, and
      a support element rotatably engaged with the first end of the stem element; said support element having a stop position in which it extends outwardly from the first end of the stem element to engage a top surface of the visual display monitor for supporting the support frame of the filter screen and having a storage position in which it is folded down towards and substantially parallel with said stem element;
   a stop position maintaining device comprising one of said support element and said stem element including a recess and the other of said stem element and said support element including a protrusion which is a press-fit in said recess when said support element is in the first stop position.

25. An optical filter screen for a visual display monitor, comprising:
   a support frame including first and second side members;
   an optical filter supported by the support frame; and
   a mounting means for supporting the support frame from a visual display monitor such that the filter is positioned adjacent a display area of the display monitor, the mounting means including:
      sliding engagement means for slidably engaging the first and second side members of the support frame;

a stem element having a first end and an opposite second end, and a support element rotatably engaged with the first end of the stem element; said support element having a stop position in which it extends outwardly from the first end of the stem element to engage a top surface of the visual display monitor for supporting the support frame of the filter screen and having a storage position in which it is folded down towards and substantially parallel with said stem element;

a stop position maintaining device comprising said part-circular section and said support rod each having at least one flat which cooperate together so that said support element is maintained in the first stop position against its own weight.

26. An optical filter screen for a visual display monitor, comprising:

a support frame including first and second side members;

an optical filter supported by the support frame; and a mounting means for supporting the support frame from a visual display monitor such that the filter is positioned adjacent a display area of the display monitor, the mounting means including:

sliding engagement means for slidably engaging the first and second side members of the support frame;

a stem element having a first end and an opposite second end, and a support element rotatably engaged with the first end of the stem element; said support element having a stop position in which it extends outwardly from the first end of the stem element to engage a top surface of the visual display monitor for supporting the support frame of the filter screen and having a storage position in which it is folded down towards and substantially parallel with said stem element;

a stop position maintaining device comprising said nose portion including a flat outer end surface which extends substantially perpendicular to said flat support portion and a stepped end of said flat outer end surface remote from said flat support surface being an interference fit with said stem element when said support rod is received in said opening of said support element.

* * * * *